Patented Nov. 14, 1922.

1,435,360

UNITED STATES PATENT OFFICE.

JOHN C. WICHMANN, OF LOS ANGELES, CALIFORNIA.

PROCESS OF MAKING RUBBERLIKE MATERIAL.

No Drawing. Application filed April 28, 1921. Serial No. 465,300.

*To all whom it may concern:*

Be it known that I, JOHN C. WICHMANN, a citizen of the United States, residing at Los Angeles, in the county of Los Angeles and State of California, have invented new and useful Improvements in Processes of Making Rubberlike Material, of which the following is a specification.

My invention relates to a process of making a rubber-like material. In my U. S. patent application for a process of making rubber-like material and resulting products, dated May 24, 1921, No. 1,379,149, I have described a process of making a rubber-like material from the members of the cactus family (Cactaceæ). In the process described in the said patent I use molybdic acid, calcium molybdic and linseed oil. I have discovered that the materials just mentioned may be dispensed with and that a smaller quantity of sodium tungstate together with acetone will produce a superior rubber-like material of the juice of members of the cactus family. The present invention is an improvement of the process described and claimed in the application just referred to. My invention consists in the steps of the process hereinafter described and claimed.

The cactus plant is macerated and placed in a steam jacketed boiler and cooked for about half an hour at 240° F. This temperature will release all the gummy and mucilaginous substances next to the skin of the plant where they are found in greatest abundance. The juice is extracted from the cooked pulp by any suitable means, such as a press. The juice is concentrated until it has the color and consistency of molasses. To 55 pounds of concentrated juice I add 12 pounds of powdered sulphur, 15 pounds of elaterite, 8 pounds of asphaltum, 5 pounds of Pará rubber dissolved in turpentine, 1 pound of acetone and 10 ounces of sodium tungstate. All the re-agents added to the cactus juice are essential in the production of the rubber-like material and none of them may be omitted, except in the case of the elaterite and asphaltum, either of which may be omitted provided the other is increased by a corresponding amount.

The sodium tungstate serves to vulcanize the cactus juice and to give tensile strength to the finished rubber composition. The asphaltum and elaterite give body to the finished product. The Pará gum appears to act as a catalyzer and a binder and serves to toughen the finished product. The sulphur acts as a vulcanizer. The acetone assists in the solution of the ingredients to form a homogeneous mixture.

In mixing the ingredients I prefer to melt the elaterite, asphaltum and sulphur, preferably in a steam jacketed boiler, and then add the mixture of elaterite, asphaltum and sulphur to the cactus juice with the other ingredients. The mass is boiled in a steam jacketed boiler for two hours, preferably at a steam pressure of twenty pounds, and is continually stirred during the boiling operation. After the boiling the mixture is poured into evaporating pans, preferably of low depth, and heated to a temperature of about 150° F. The mass gradually oxidizes and solidifies, requiring from five to six days to become solid. The resulting product is dark in color and resembles the crude Pará rubber of commerce, and is superior in elasticity and tensile strength to the rubber product made by the process described in my co-pending application above referred to.

My product may now be treated like any other rubber in the manufacture of rubber articles, such as inner tubes, tire casings, rubber heels and the like.

Various changes may be made in the steps of the process by those skilled in the art without departing from the spirit of my invention as claimed.

I claim:

1. A process of making a rubber-like substance, comprising heating the fleshy parts of members of the cactus family above the boiling point of water, extracting the juice therefrom, adding sulphur, elaterite and asphaltum, Pará rubber dissolved in turpentine, sodium tungstate and acetone, boiling the mixture under agitation and drying and oxidizing the resulting mass.

2. A process of making a rubber-like substance, comprising heating the fleshy parts of members of the cactus family above the boiling point of water, extracting the juice therefrom, adding sulphur and asphaltum, Pará rubber dissolved in turpentine, sodium tungstate and acetone, boiling the mixture under agitation and drying and oxidizing the resulting mass.

3. A process of making a rubber-like substance, comprising heating the fleshy parts of members of the cactus family above the boiling point of water, extracting the juice therefrom, concentrating the juice until it is of the consistency of molasses and adding to each fifty-five pounds of concentrated juice twelve pounds of sulphur, fifteen pounds of elaterite, eight pounds of alphaltum, five pounds of Pará rubber dissolved in turpentine, one pound of acetone and ten ounces of sodium tungstate, boiling the mixture under agitation, and drying and oxidizing the resulting mass.

In testimony whereof I have signed my name to this specification.

JOHN C. WICHMANN.